United States Patent [19]
Hanselmann et al.

[11] Patent Number: 5,893,272
[45] Date of Patent: Apr. 13, 1999

[54] METHOD FOR CONTROLLING A COMPRESSOR OF A MOTOR VEHICLE AIR CONDITIONER

[75] Inventors: Klaus Hanselmann, Jettingen; Werner Salzer, Sindelfingen, both of Germany

[73] Assignee: Daimler-Benz Aktiengesellschaft, Stuttgart, Germany

[21] Appl. No.: 08/953,370

[22] Filed: Oct. 17, 1997

[30] Foreign Application Priority Data

Oct. 17, 1996 [DE] Germany ............... 196 42 832

[51] Int. Cl.$^6$ ............................................. B60H 1/32
[52] U.S. Cl. ............................... 62/133; 62/228.5
[58] Field of Search ................... 62/133, 228.1, 62/228.4, 228.5, 229, 230, 243, 323.1

[56] References Cited

U.S. PATENT DOCUMENTS

| | | | |
|---|---|---|---|
| 5,199,272 | 4/1993 | Yamanaka et al. | 62/133 |
| 5,257,507 | 11/1993 | Taguchi | 62/228.5 X |
| 5,285,649 | 2/1994 | Yamanaka et al. | 62/323.1 X |
| 5,752,387 | 5/1998 | Inagaki et al. | 62/133 |

FOREIGN PATENT DOCUMENTS 0 288 658 11/1988 European Pat. Off. .
38 43 924 7/1989 Germany .

*Primary Examiner*—Harry B. Tanner
*Attorney, Agent, or Firm*—Evenson, McKeown, Edwards & Lenahan, P.L.L.C.

[57] ABSTRACT

A method for controlling a compressor of a motor vehicle air conditioner that is designed for variable power draw and is driveable by the vehicle drive. The power draw of the compressor is subject to an upper limit that is set variably as a function of the difference between the maximum drive torque that the vehicle drive can deliver and the drive torque that is required to drive the vehicle. During a vehicle acceleration maneuver, the air conditioning power of the air conditioner is reduced only to the degree required to reach the desired acceleration.

2 Claims, 2 Drawing Sheets

METHOD FOR CONTROLLING A COMPRESSOR OF A MOTOR VEHICLE AIR CONDITIONER

BACKGROUND AND SUMMARY OF THE INVENTION

This application claims the priority of German patent application 196 42 832.7, the disclosure of which is expressly incorporated by reference herein.

The invention relates to a method for controlling a compressor of a motor vehicle air conditioner designed for variable power draw and driveable by the vehicle drive.

A method of this kind is described in German patent document DE 38 43 924 C2. In the air conditioner disclosed in this document, the thermal load on the system is detected and the required compressor intake pressure and the drive torque required to provide it are determined for the compressor. During those time intervals in which the engine provided as a vehicle drive is running at idle, the idle rpm is increased to enable the determined compressor drive torque to be delivered without the engine stalling. If the engine is already running at an increased rpm, the drive torque for the compressor is drawn from the engine drive torque that serves to drive the vehicle.

Furthermore, in motor vehicle air conditioners with compressors driveable by the vehicle drive, it is already known to switch off the compressor temporarily during those vehicle operating phases in which the driver calls for powerful vehicle acceleration, for passing maneuvers for example, in order to have available all of the driving torque generated by the vehicle drive for driving the vehicle. This measure is described for example in European patent document EP 0 288 658 B1.

There is a need for that allows an air conditioner to operate even during powerful acceleration maneuvers without significantly adversely affecting the ability of the vehicle to accelerate.

This and other needs have been met according to the present invention by providing a method for controlling a compressor of a motor vehicle air conditioner, the compressor being designed for variable power draw and driven by the vehicle drive, characterized in that the power draw of compressor is subject to an upper limit that is set as a function of the difference between the maximum drive torque that the vehicle drive can deliver to the drive torque required for driving the vehicle.

This and other needs have also been met according to the present invention by providing a method for controlling a variable-power air conditioner compressor in a motor vehicle, comprising the steps of: determining an engine torque value required to drive the air conditioner compressor to achieve a cooling level requested by a user ($T_{ACreq}$) ; determining a maximum available engine torque value ($T_{max}$); determining an engine torque value required for vehicle movement; and setting an actual torque fed to the variable-power air conditioner compressor ($T_{act}$) to the lesser of: (i) $T_{ACreq}$; and (ii) $T_{max}-T_{drive}$.

According to the present invention, the power draw of the compressor is subject to an upper limit that is set variably as a function of the difference between the maximum drive torque that the vehicle drive can provide and the drive torque required for driving the vehicle. In this manner, during an acceleration or starting maneuver required by the driver, the cooling power of the air conditioner is reduced only to the level required for actually performing the acceleration or starting maneuver with the desired acceleration. For this purpose, the compressor generally does not have to be shut off completely, but continues operating at the reduced power subject to the respective limit. As a result, optimum cooling of the vehicle interior and improved air conditioning comfort is achieved and unnecessary switching processes involving the compressor that compresses the coolant are avoided.

Other objects, advantages and novel features of the present invention will become apparent from the following detailed description of the invention when considered in conjunction with the accompanying drawings.

DETAILED DESCRIPTION OF THE DRAWINGS

Figure 1:
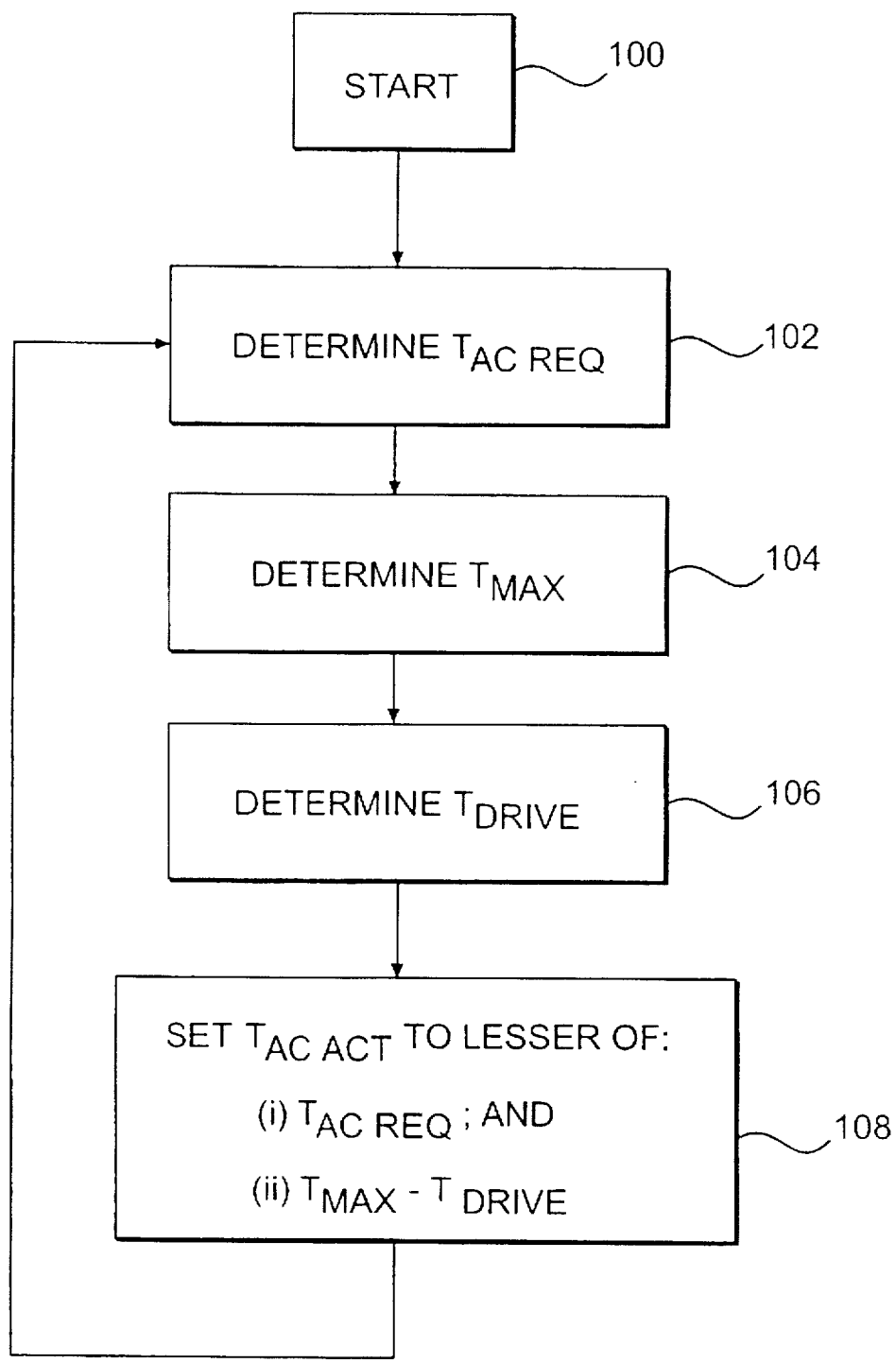
FIG. 1 is a flow chart showing a preferred method of controlling a compressor of a motor vehicle air conditioner according to the present invention.

As shown in FIG. 1, the method is started in step 100. In step 102, the engine torque required to drive the air conditioner compressor to achieve a cooling level requested by the user ($T_{ACreq}$) is determined. This requested torque is determined in a known manner from sensor signals from the air conditioner control set by the user. In step 104, the maximum engine torque available ($T_{max}$) is determined. This maximum available engine torque is determined based on a characteristic torque curve for the specific engine, which typically varies as a function of the engine speed. In step 106, the engine torque required for vehicle movement, i.e., vehicle velocity and acceleration, demanded by the user ($T_{drive}$) is determined. This demanded drive torque is sensed in a known manner, for example from an input from the accelerator pedal. In step 108, the actual torque fed to the variable-power air conditioner compressor ($T_{act}$) is set to the lesser of: (i) the engine torque required to drive the compressor to achieve the cooling level requested by the user ($T_{ACreq}$); and (ii) the difference between the maximum available engine torque ($T_{max}$) and the engine torque required for vehicle movement ($T_{drive}$).

Figure 2:
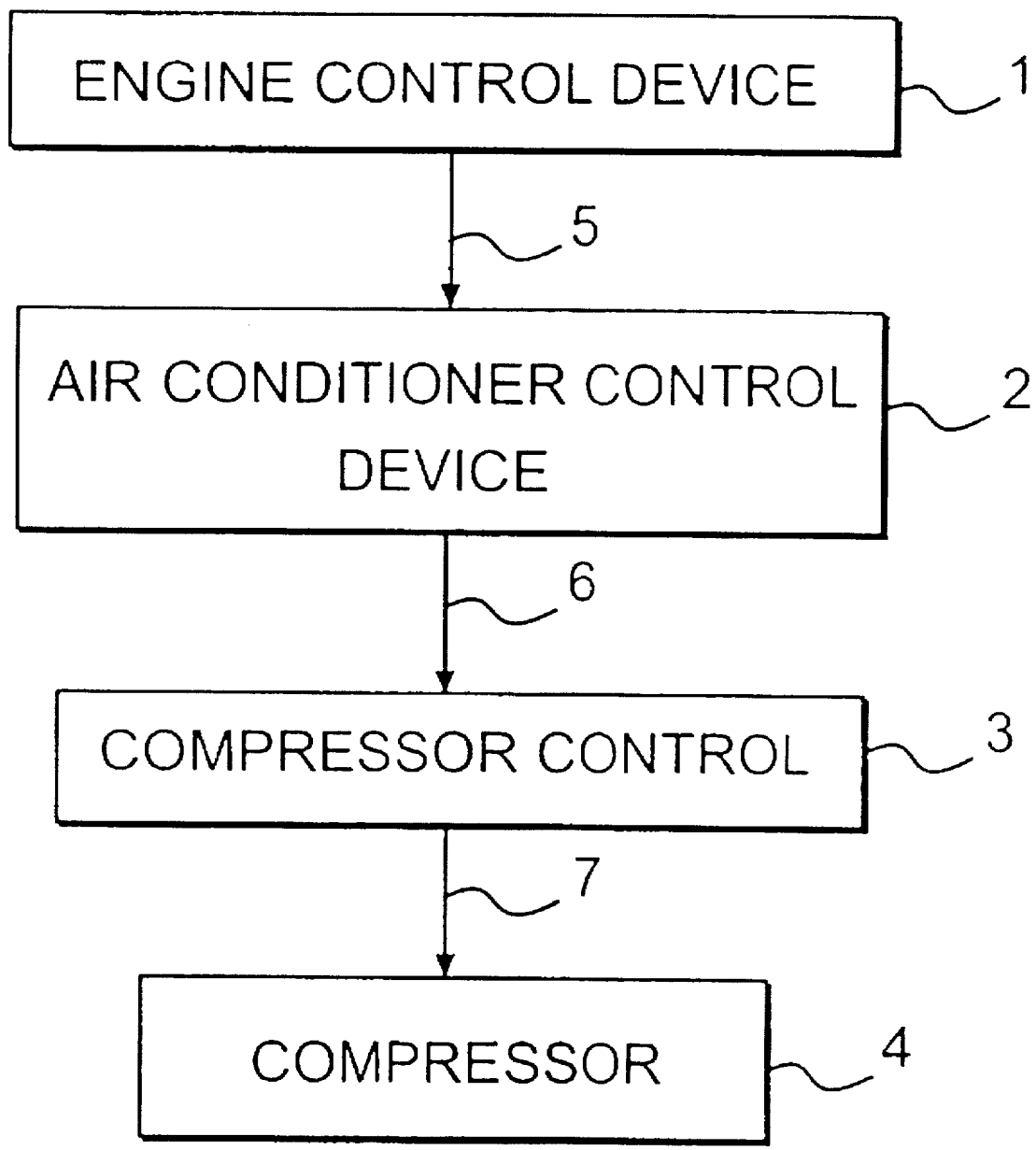
FIG. 2 shows a schematic block diagram of components used to control a compressor of a motor vehicle air conditioner according to the method of the present invention.

FIG. 2 shows components related to an air conditioning system of a motor vehicle, including an engine control device 1, an air conditioner control device 2, a compressor control 3, and an air conditioner compressor. These components having an essentially conventional design that does not require closer explanation here. In this connection, compressor 4 is a compressor with a variable power draw, in other words, with an adjustable intake pressure. In addition, the components are designed so that they provide the functions, described in greater detail below, required to achieve the method according to the invention, as is readily apparent to the individual skilled in the art who is familiar with these functions, using corresponding modifications of conventional components.

Using the compressor control method described below, during vehicle acceleration maneuvers, reduced compressor drive and thus air conditioner operation as well is maintained so that the maximum drive torque that can be provided at a given time by an internal combustion engine as a vehicle drive remains at or above the drive torque required for the desired acceleration of the vehicle. The procedure is as follows:

Initially, engine control device 1, after detecting an acceleration request by the driver, for example by sensing an accelerator movement, sets the desired vehicle acceleration and the drive torque required for this purpose. Using this information, engine control device 1 then calculates the difference between the maximum drive torque that the engine can deliver at the instant velocity of the engine, e.g. rpm in a reciprocating piston engine, and the drive torque required for driving the vehicle, as the currently available drive torque for compressor 4. Since the maximum drive torque of an engine typically varies as a function of the engine speed, the currently available drive torque for compressor 4 will vary as a function of the engine speed, as well as a function of the detected desired vehicle acceleration. The maximum drive torque of the engine may be calculated as a function of the instant engine speed, for example according to the characteristic torque curve of the engine, or may be selected and/or interpolated from a table of characteristic torque values in a known manner. The corresponding signal information 5 regarding the currently permissible compressor drive torque is provided by engine control device 1 to air conditioner control device 2.

From this information on the drive torque currently available from the engine for the compressor, air conditioner control device 2 sets a corresponding upper limit for the current maximum admissible power that compressor 4 can accept without interfering with the desired vehicle acceleration maneuver. Air conditioner control device 2 also determines the actual compressor power required for this purpose in the usual fashion, on the basis of the sensor signals it receives and the settings for the desired air conditioning operation set by the user using a corresponding conventional air conditioner control, not shown. Air conditioner control device 2 compares the latter with the specified compressor power limit and supplies the smaller of these two values as a set point for compressor power to compressor control 3 in the form of a corresponding power set point signal 6. The compressor control 3 then controls compressor 4 through corresponding control line 7 so that it delivers the specified set power. The compressor power is adjusted by a variation in the intake pressure, for which purpose compressor 4 is equipped with a controllable intake pressure-regulating valve as is known from conventional compressors of this type with variable power draw. The compressor power can be varied continuously in this fashion. Alternatively, a stepped power change can also be provided.

This method also makes it possible to reduce the cooling power of the air conditioner only to the degree required for performing a required vehicle acceleration maneuver. As long as no acceleration maneuver has been called for, the admissible compressor power limit corresponds to the compressor's maximum power, so that the compressor control always sets the compressor power that results in the air conditioning operation selected by the user with the air conditioner control system. As soon as a driving phase involving significant acceleration occurs, the limit of the admissible compressor power decreases as the acceleration increases. If the compressor power associated with the type of air conditioning operation that has been selected exceeds this limit, the actual setting for the power draw by compressor control 3 on compressor 4 is limited to this limiting value. Then, to a degree that depends on the vehicle acceleration, a certain level of air conditioning operation is maintained, resulting in a considerable improvement in air conditioning comfort by comparison with complete compressor shutoff, and in particular permits optimized cooling of the vehicle interior. In addition, unnecessary frequent switching on and off of compressor 4 is avoided. On the other hand, this procedure prevents the desired vehicle driving power for driving the vehicle from not being available at all times due to compressor operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for controlling a compressor of a motor vehicle air conditioner driven by a vehicle drive, said compressor being designed for variable power draw wherein the power draw of the compressor is controlled to an upper limit that is set as a function of the difference between a maximum drive torque that the vehicle drive can deliver and a drive torque required for driving the vehicle.

2. A method for controlling a variable-power air conditioner compressor in a motor vehicle, comprising the steps of:

determining an engine torque value required to drive the air conditioner compressor to achieve a cooling level requested by a user ($T_{ACreq}$);

determining a maximum available engine torque value ($T_{max}$);

determining an engine torque value required for vehicle movement; and setting an actual torque fed to the variable-power air conditioner compressor ($T_{act}$) to the lesser of: (i) $T_{ACreq}$; and (ii) $T_{max} - T_{drive}$.

* * * * *